US011375533B2

United States Patent
Lin et al.

(10) Patent No.: US 11,375,533 B2
(45) Date of Patent: Jun. 28, 2022

(54) COMMUNICATION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventors: Yanan Lin, Guangdong (CN); Zuomin Wu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/475,284

(22) Filed: Sep. 14, 2021

(65) Prior Publication Data

US 2022/0007407 A1    Jan. 6, 2022

Related U.S. Application Data

(63) Continuation of application No. PCT/CN2019/079762, filed on Mar. 26, 2019.

(51) Int. Cl.
*H04W 72/12* (2009.01)
*H04L 1/18* (2006.01)

(52) U.S. Cl.
CPC ....... *H04W 72/1289* (2013.01); *H04L 1/1812* (2013.01)

(58) Field of Classification Search
CPC ... H04W 28/04; H04W 72/04; H04W 72/042; H04W 88/08; H04W 72/1289; H04L 5/0007; H04L 1/1812

(Continued)

(56) References Cited

U.S. PATENT DOCUMENTS

2014/0146775 A1*  5/2014  Guan ............... H04L 5/0053
                                                  370/329
2015/0124771 A1*  5/2015  Ko  .................. H04L 5/0055
                                                  370/329

(Continued)

FOREIGN PATENT DOCUMENTS

CN    105024781 A  * 11/2015  ........... H04L 1/0003
CN    105722229 A  *  6/2016  ........... H04L 1/1614

(Continued)

OTHER PUBLICATIONS

3GPP TSG RAN WG1 Meeting #96, Athens, Greece, Feb. 25-Mar. 1, 2019, R1-1903423, Agenda item: 7.2.2.2.3, Source: Huawei, Title: Feature lead summary of HARQ enhancements for NR-U. (Year: 2019).*

(Continued)

*Primary Examiner* — Peter G Solinsky
*Assistant Examiner* — Sanjay K Dewan
(74) *Attorney, Agent, or Firm* — Perkins Coie LLP

(57) ABSTRACT

Provided are a communication method, a terminal device and a network device. The method comprises: a terminal device receiving downlink control information (DCI), wherein the DCI comprises a first information field, and the DCI is used for scheduling at least one physical downlink shared channel (PDSCH); according to whether the first information field is used for triggering a feedback sequence, the terminal device determining transmission parameters for sending, on the physical channel, the feedback sequence; and by using the transmission parameters, the terminal device sending, on the physical channel, the feedback sequence.

17 Claims, 3 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2015/0195823 A1* | 7/2015 | Seo .................. | H04W 72/0406 370/329 |
| 2015/0264678 A1 | 9/2015 | Yin et al. | |
| 2016/0135143 A1* | 5/2016 | Won ...................... | H04W 12/08 370/312 |
| 2017/0048861 A1* | 2/2017 | Choi .................... | H04L 5/0053 |
| 2017/0141903 A1 | 5/2017 | Xu et al. | |
| 2017/0346605 A1* | 11/2017 | Chendamarai Kannan ................. | H04W 16/14 |
| 2018/0324689 A1* | 11/2018 | Li ......................... | H04W 48/16 |
| 2018/0343650 A1 | 11/2018 | Zhou | |
| 2019/0150196 A1* | 5/2019 | Koorapaty ........ | H04W 72/0446 370/329 |

FOREIGN PATENT DOCUMENTS

| | | | | |
|---|---|---|---|---|
| CN | 105722229 | A | 6/2016 | |
| CN | 104601304 | B | 9/2018 | |
| CN | 108574987 | A | 9/2018 | |
| CN | 109196941 | A | 1/2019 | |
| EP | 3139529 | A1 | 3/2017 | |
| JP | WO 2017/193808 | A1 * | 11/2017 | ........... H04B 17/309 |
| RU | 2546617 | C2 | 4/2015 | |
| RU | 2549154 | C2 | 4/2015 | |
| RU | 2566976 | C2 | 10/2015 | |
| WO | 2017193808 | A1 | 11/2017 | |

OTHER PUBLICATIONS

Huawei, Feature lead summary of HARQ enhancements for NR-U, Discussion and Decision, 3GPP TSG RAN WG1 Meeting #96 R1-1903423, Feb. 25-Mar. 1, 2019.
International Search Report in the international application No. PCT/CN2019/079762, dated Jan. 2, 2020.
3GPP TSG RAN WG1 #96 R1-1901677, Athens, Greece, Feb. 25-Mar. 1, 2019; Source: vivo; Title: Discussion on HARQ operation for NR-U. 7 pages.
3GPP TSG RAN WG1 Meeting #95 R1-1812358, Spokane, USA, Nov. 12-16, 2018 Agenda Item: 7.2.2.4.3; Source: MediaTek Inc.; Title: Enhancements on HARQ for NR-U operation. 7 pages.
3GPP TSG RAN WG1 Meeting #96 R1-1902473, Athens, Greece, Feb. 25-Mar. 1, 2019; Agenda Item: 7.2.2.2.3; Source: Intel Corporation; Title: Enhancements to HARQ for NR-unlicensed. 7 pages.
First Office Action of the Chinese application No. 202110441929.8, dated Mar. 30, 2022. 20 pages with English translation.
First Office Action of the Russian application No. 2021130414, dated Mar. 23, 2022. 12 pages with English translation.
Office Action of the Indian application No. 202127043411, dated Mar. 30, 2022. 5 pages with English translation.
Supplementary European Search Report in the European application No. 19921001.4, dated Feb. 23, 2022. 10 pages.

* cited by examiner

COMMUNICATION METHOD, TERMINAL DEVICE AND NETWORK DEVICE

CROSS-REFERENCE TO RELATED APPLICATION

This is a continuation application of International Patent Application No. PCT/CN2019/079762, filed on Mar. 26, 2019, the content of which is hereby incorporated by reference in its entirety.

TECHNICAL FIELD

Embodiments of the disclosure relate to the technical field of communications, and more particularly to a communication method, a terminal device and a network device.

RELATED ARTS

In a communication system, a network device may schedule a Physical Downlink Shared Channel (PDSCH) to a terminal device through Downlink Control information (DCI). The terminal device may detect the PDSCH and send feedback information based on a detection result.

With the development of communication system, the flexibility of communication is more and more demanding. How to improve the flexibility of feedback information transmission is an urgent problem to be solved.

SUMMARY

The embodiments of the disclosure provide a communication method, a terminal device and a network device.

A first aspect provides a communication method, which may include the following operations. A terminal device receives DCI, the DCI including a first information field and being used for scheduling at least one PDSCH. Based on whether the first information field is used for triggering a feedback sequence, the terminal device determines a transmission parameter for sending the feedback sequence on a physical channel. The terminal device sends the feedback sequence on the physical channel by using the transmission parameter.

A second aspect provides a communication method, which may include the following operations. A network device sends DCI, the DCI including a first information field and being used for scheduling at least one PDSCH. Based on whether the first information field is used for triggering a feedback sequence, the network device determines transmission parameter for receiving the feedback sequence on a physical channel. The network device receives the feedback sequence on the physical channel by using the transmission parameter.

A third aspect provides a terminal device, which may be configured to execute the method in the first aspect.

A fourth aspect provides a network device, which may be configured to execute the method in the second aspect.

A fifth aspect provides a communication device, which may include a processor, a memory and a transceiver. The memory may be configured to store a computer program, and the processor may be configured to call and run the computer program stored in the memory to execute the method in the first aspect or the second aspect based on the transceiver.

A sixth aspect provides a chip, which may be configured to implement the method in the first aspect or the second aspect.

A seventh aspect provides a computer-readable storage medium, configured to store a computer program, the computer program enabling a computer to execute the method in the first aspect or the second aspect.

An eighth aspect provides a computer program product, including a computer program instruction, the computer program instruction enabling a computer to execute the method in the first aspect or the second aspect.

A ninth aspect provides a computer program, which runs in a computer to enable the computer to execute the method in the first aspect or the second aspect.

DETAILED DESCRIPTION

The technical solutions in the embodiments of the disclosure will be described below in combination with the drawings in the embodiments of the disclosure. It is apparent that the described embodiments are not all embodiments but part of embodiments of the disclosure. All other embodiments obtained by those of ordinary skill in the art based on the embodiments in the disclosure without creative work shall fall within the scope of protection of the disclosure.

The technical solutions of the embodiments of the disclosure may be applied to various communication systems, for example, a Global System of Mobile communication (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD), a Universal Mobile Telecommunication System (UMTS), a Worldwide Interoperability for Microwave Access (WiMAX) communication system or a 5G system.

Figure 1:
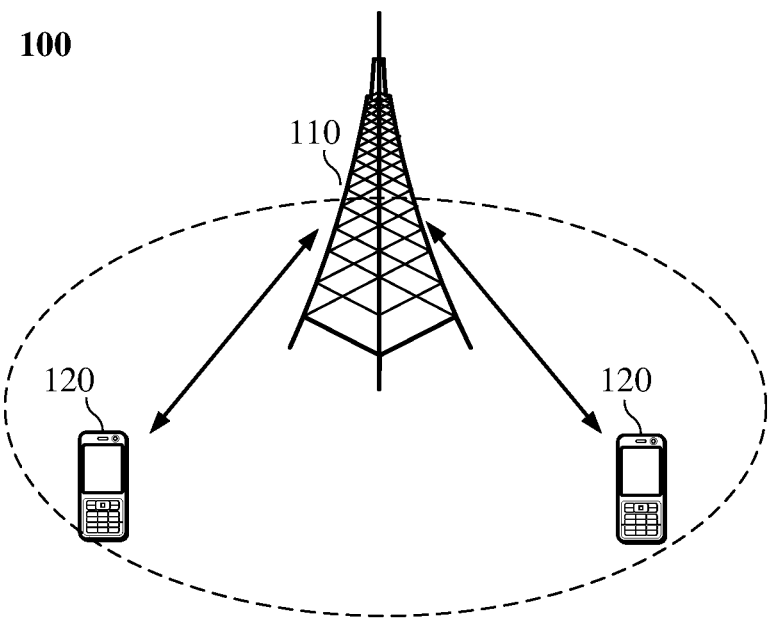
FIG. 1 is a schematic diagram of a communication system architecture according to an embodiment of the disclosure.

Exemplarily, a communication system 100 that the embodiments of the disclosure are applied to is shown in FIG. 1. The communication system 100 may include a network device 110, and the network device 110 may be a device communicating with a terminal device 120 (or called a communication terminal and a terminal). The network device 110 may provide communication coverage for a specific geographical region and may communicate with a terminal device located in the coverage. Optionally, the network device 110 may be a Base Transceiver Station (BTS) in the GSM system or in the CDMA system, may also be a NodeB (NB) in the WCDMA system, and may further be an Evolutional Node B (eNB or eNodeB) in the LTE system or a wireless controller in a Cloud Radio Access Network (CRAN). Or the network device may be a mobile switching center, a relay station, an access point, a vehicle device, a wearable device, a hub, a switch, a network bridge, a router, a network-side device in a 5G network, or a network device in a future evolved Public Land Mobile Network (PLMN) or the like.

The communications system 100 further includes at least one terminal device 120 located within the coverage range of the network device 110. The "terminal" used herein includes, but is not limited to: being connected through a wired line, for example, through a public switched telephone network (PSTN), a digital subscriber line (DSL), a digital cable, or a direct cable; and/or another data connection/network; and/or being connected through a wireless interface, for example, through a cellular network, a wireless local area network (WLAN), a digital television network such as a digital video broadcasting-handheld (DVB-H) network, a satellite network, or an AM-FM broadcast transmitter; and/or an apparatus of another terminal that is configured to receive/send communications signals; and/or an Internet of Things (IoT) device. The terminal that is configured to communicate through the wireless interface may be referred to as a "wireless communications terminal", a "wireless terminal", or a "mobile terminal". An example of the mobile terminal includes, but is not limited to, a satellite or a cellular phone; a personal communications system (PCS) terminal that combines a cellular radio telephone, data processing, fax, and data communication capabilities; and may be a personal digital assistant (PDA) including a radio telephone, a beeper, Internet/Intranet access, a web browser, a memo pad, a calendar, and/or a global positioning system (GPS) receiver; and may be a conventional laptop and/or palmtop receiver or another electronic apparatus including a radio telephone transceiver. The terminal may be an access terminal, user equipment (UE), a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a Session Initiation Protocol (SIP) phone, a wireless local loop (WLL) station, a PDA, a handheld device having a wireless communication function, a computing device, another processing device connected to a wireless modem, an in-vehicle device, a wearable device, a terminal in a 5G network, a terminal in a future evolved PLMN, or the like.

Optionally, the terminal devices 120 may perform Device to Device (D2D) communication with each other.

Optionally, the 5G system or the 5G network may also be called an NR system or an NR network.

A network device and two terminal devices are exemplarily shown in FIG. 1. Optionally, the communication system 100 may include multiple network devices and another number of terminal devices may be included in coverage of each network device. This is not limited in the embodiments of the disclosure.

Optionally, the communication system 100 may further include another network entity such as a network controller and a mobility management entity. This is not limited in the embodiments of the disclosure.

It is to be understood that a device with a communication function in the network/system in the embodiments of the disclosure may be called a communication device. For example, for the communication system 100 shown in FIG. 1, communication devices may include the network device 110 and terminal device 120 with the communication function, and the network device 110 and the terminal device 120 may be the specific devices mentioned above and will not be elaborated herein. The communication devices may further include other devices in the communication system 100, for example, other network entities like a network controller and a mobility management entity. There are no limits made thereto in the embodiments of the disclosure.

It is to be understood that terms "system" and "network" in the disclosure may usually be exchanged in the disclosure. In the disclosure, term "and/or" is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

The method in the embodiments of the disclosure may be applied to the communication on an unlicensed spectrum.

The unlicensed spectrum is the spectrum divided by country and region that can be used for radio devices to communicate. The spectrum may be considered as a shared spectrum, that is, communication devices in different communication systems may use the spectrum as long as they meet the regulatory requirements set by the country or region on the spectrum, and may not apply to the government for exclusive spectrum authorization. In order to enable the various communication systems that use the unlicensed spectrum for wireless communication to coexist amicably on the spectrum, the principle of Listen Before Talk (LBT) can be followed when the communication devices communicate on the unlicensed spectrum, that is, the communication device needs to perform channel sensing (or channel detection) before sending a signal on an unlicensed spectrum channel. The communication device can send the signal only when a channel sensing result is that the channel is idle. If the result of channel sensing performed by the communication device on the unlicensed spectrum is that the channel is busy, the communication device cannot send the signal. In the unlicensed spectrum, Maximum Channel Occupancy Time (MCOT) may be the maximum length of time allowing the use of an unlicensed spectrum channel for signal transmission after LBT succeeds. Different channel access schemes have different MCOT. The maximum value of MCOT may be, for example, 10 ms. It is to be understood that the MCOT is the time occupied by signal transmission. Channel Occupancy Time (COT) may be the length of time for signal transmission using the unlicensed spectrum channel after LBT succeeds. The channel occupied by the signal may be discontinuous within the length of time. The maximum length of the COT shall not exceed, for example, 20 ms, and the length of time occupied by the signal transmission in the COT shall not exceed the MCOT.

In addition to a communication scenario of the unlicensed spectrum, the embodiments of the disclosure may also be applied to other communication scenarios, such as a communication scenario of licensed spectrum.

Figure 2:
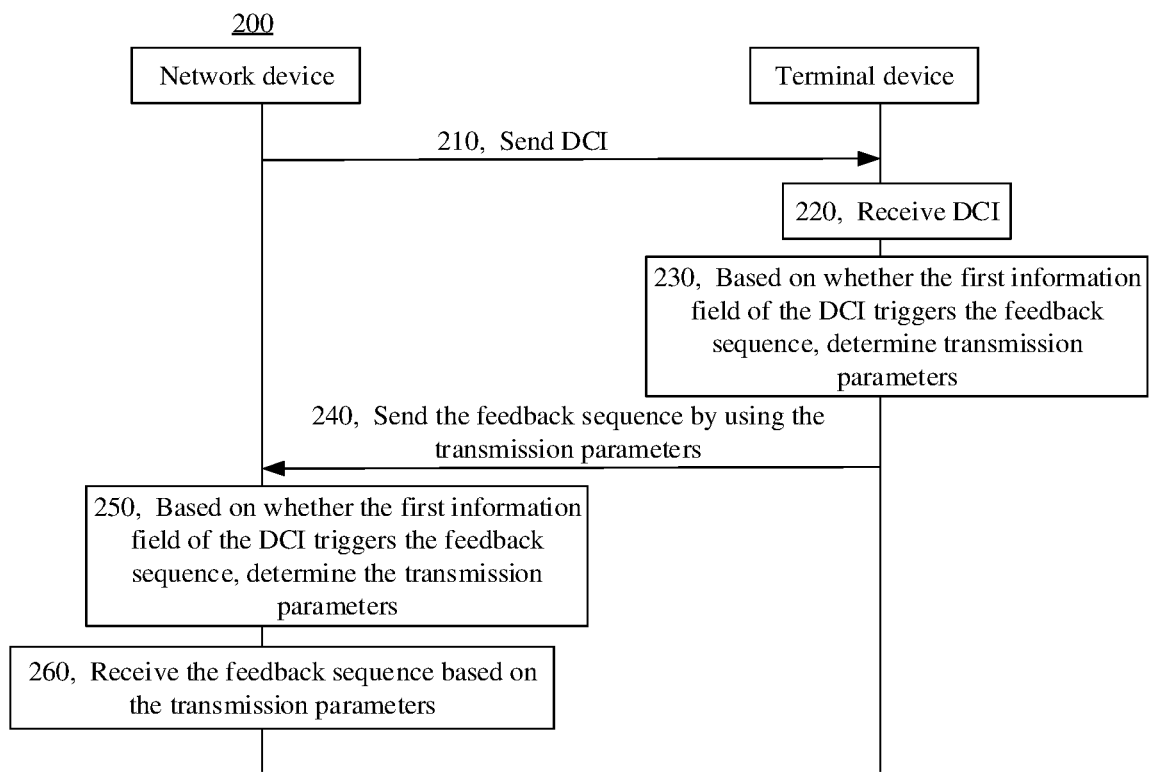
FIG. 2 is a schematic diagram of a communication method according to an embodiment of the disclosure.

FIG. 2 is a schematic flowchart of a communication method 200 according to an embodiment of the disclosure. The method 200 includes at least a part of the following contents.

S210, a network device sends DCI, which is used for scheduling at least one PDSCH.

The DCI in the embodiments of the disclosure may be the DCI used for scheduling the PDSCH; and in this case, the DCI may be used for triggering a feedback sequence.

It is to be understood that the embodiments of the disclosure are not limited to this. The DCI in the embodiments of the disclosure may also not be used for scheduling the PDSCH; and in this case, the DCI may also be used for triggering the feedback sequence, for example, when the DCI is the DCI with a particular format, the DCI may be used for triggering the feedback sequence.

The feedback sequence mentioned in the embodiments of the disclosure may be obtained by cascading at least one piece of feedback information. Each of feedback information may correspond to a PDSCH for feeding back the reception of the corresponding PDSCH. For example, Negative Acknowledgement (NACK) feedback information is used for feeding back to the network device that the corresponding PDSCH is lost or not received correctly, and Acknowledgement (ACK) feedback information is used for feeding back to the network device that the corresponding PDSCH is received correctly.

In the embodiments of the disclosure, sending or receiving the channels (such as a PDSCH, a Physical Downlink Control Channel (PDCCH), or a Physical Uplink Control Channel (PUCCH)) may refer to sending or receiving information carried in the channels.

In S220, a terminal device receives the DCI from the network device.

The DCI in the embodiments of the disclosure may be carried in the PDCCH. The terminal device may receive the DCI by detecting a search space of the PDCCH.

In S230, based on whether the first information field included in the DCI is used for triggering a feedback sequence, the terminal device determines transmission parameter for sending the feedback sequence on the physical channel.

In the embodiments of the disclosure, the DCI may be used for triggering the feedback sequence. The implementation that the DCI is used for triggering the feedback sequence can be achieved through the following two modes. In an implementation, the feedback sequence may be triggered through the first information field (that is, the first information field is used for triggering the feedback sequence). In another implementation, the feedback sequence may not be triggered through the first information field (that is, the first information field is not used for triggering the feedback sequence), that is, the feedback sequence may be triggered in a triggering mode of non-first information field; specifically, the feedback sequence may be triggered by the DCI scheduling the PDSCH.

Optionally, in the embodiments of the disclosure, the first information field included in the DCI may include at least one bit. When the value of at least one bit is a first value (which may be the value in a value range), it indicates that the first information field is used for triggering the feedback sequence. When the value of at least one bit is a second value (which may be the value in other value range), it indicates that the first information field is not used for triggering the feedback sequence, and in this case, the feedback sequence may be triggered by the DCI scheduling the PDSCH.

For example, assuming that the first information field included in the DCI includes a bit, when the value of the bit is 1, it indicates that the first information field is used for triggering the feedback sequence; and when the value of the bit is 0, it indicates that the first information field is not used for triggering the feedback sequence.

For example, assuming that the first information field included in the DCI includes multiple bits, when the values of the multiple bits are not all 0, it indicates that the first information field is used for triggering the feedback sequence; and when the values of the bits are all 0, it indicates that the first information field is not used for triggering the feedback sequence.

Optionally, in the embodiments of the disclosure, the PDSCH corresponding to the feedback sequence triggered by the first information field and the PDSCH corresponding to the feedback sequence triggered by the non-first information field may be the same or different.

In an implementation, if the first information field is not used for triggering the feedback sequence, the PDSCH corresponding to the feedback sequence triggered by the DCI may be the PDSCH scheduled by the DCI or a PDSCH determined based on the PDSCH scheduled by the DCI.

Specifically, a time window may be determined based on the PDSCH scheduled by the DCI, and the PDSCH in the time window is taken as the PDSCH corresponding to a feedback sequence to be sent.

For example, based on the time unit occupied by the PDSCH scheduled by the DCI, N time units before the time unit are counted, and the PDSCH in the N time units and the PDSCH scheduled by the DCI are taken as the PDSCH targeted by the feedback sequence.

For example, based on the time unit occupied by the PDSCH scheduled by the DCI, N time units after the time unit are counted, and the PDSCH in the N time units and the PDSCH scheduled by the DCI are taken as the PDSCH targeted by the feedback sequence.

For example, based on the time unit occupied by the PDSCH, S time units before the time unit and M time units after the time unit are counted, and the PDSCH in the S time units, the PDSCH in the M time units and the PDSCH scheduled by the DCI are taken as the PDSCH targeted by the feedback sequence.

It is to be understood that the time unit referred to in the embodiments of the disclosure may be a time slot, a mini time slot, or a symbol, etc.

Or, if the first information field is not used for triggering the feedback sequence, the PDSCH corresponding to the feedback sequence triggered by the DCI may include the PDSCH scheduled by the DCI, and L forward PDSCHs and/or K backward PDSCHs based on the PDSCH scheduled by the DCI.

In the embodiments of the disclosure, if the first information field is used for triggering the feedback sequence, the feedback sequence triggered by the first information field may be determined without reference to the PDSCH scheduled by the current DCI, or, of course, may be determined based on the PDSCH scheduled by the current DCI.

Optionally, the PDSCH corresponding to the feedback sequence triggered by the first information field may be at least one of the following.

1) The PDSCH corresponding to at least one HARQ process index supported by the terminal device.

The PDSCH corresponding to the feedback sequence triggered by the first information field may be the PDSCH corresponding to all or part of HARQ process indexes supported by the terminal device. If there are some process indexes not scheduled, placeholder information may be added to the feedback sequence. For example, the NACK information is taken as the placeholder information. Specifically, the PDSCH feedback information about which process indexes corresponding to PDSCHs may be indicated in the DCI.

2) The PDSCH received in the PDSCHs corresponding to at least one HARQ process index supported by the terminal device.

The PDSCH corresponding to the feedback sequence triggered by the first information field may be the PDSCH received in the PDSCHs corresponding to all the HARQ process indexes supported by the terminal device. Specifically, the PDSCH feedback information about which process indexes corresponding to PDSCHs that are received may be indicated in the DCI.

It is to be understood that the received PDSCH mentioned in the embodiments of the disclosure may refer to the PDSCH that is learned by the terminal device and scheduled by the network device, and the terminal device performs a detection operation for the scheduled PDSCH, which may or may not be correctly received.

3) The PDSCH corresponding to at least one HARQ process index group supported by the terminal device.

Specifically, the HARQ process indexes supported by the terminal device may be grouped, and the terminal device may feed back the PDSCH corresponding to all or part of the HARQ process index groups. If there are some process indexes not scheduled, placeholder information may be added to the feedback sequence. For example, the NACK information is taken as the placeholder information. Specifically, the PDSCH feedback information about which process index groups corresponding to PDSCHs may be indicated in the DCI.

4) The PDSCH received in the PDSCHs corresponding to at least one HARQ process index group supported by the terminal device.

Specifically, the HARQ process indexes supported by the terminal device may be grouped, and the terminal device may feed back the PDSCH received in the PDSCHs corresponding to all or part of the HARQ process index groups. Specifically, the PDSCH feedback information about which process index groups corresponding to PDSCHs that are received may be indicated in the DCI.

5) The PDSCH included in at least one PDSCH group.

Specifically, the PDSCHs may be grouped, and the terminal device may feed back the feedback information of all the PDSCHs in at least one PDSCH group. If there are some PDSCHs not scheduled, placeholder information may be added to the feedback sequence. For example, the NACK information is taken as the placeholder information. Specifically, the feedback information about which the PDSCH groups may be indicated in the DCI.

6) The PDSCH received in the PDSCHs included in at least one PDSCH group.

Specifically, the PDSCHs may be grouped, and the terminal device may feed back the feedback information of the PDSCH received in at least one PDSCH group. Specifically, the PDSCH feedback information about which the PDSCH groups receive the PDSCHs may be indicated in the DCI.

7) The PDSCH received in a specific time period before the DCI.

Specifically, based on the time unit occupied by the DCI, the PDSCH received in a specific time period before the time unit may be triggered by the first information field to feed back information.

8) The PDSCH received in a specific time period before the PDSCH scheduled by the DCI.

Specifically, based on the time unit occupied by the PDSCH scheduled by the DCI, the PDSCH received in a specific time period before the time unit may be triggered by the first information field to feed back information.

9) A first PDSCH received before the DCI, the feedback information of the first PDSCH being not allocated with transmission resources.

Specifically, if the PDSCH received before the DCI is not allocated with a transmission resource for sending the feedback information, then the first information field may trigger the feedback information for the PDSCH.

10) A second PDSCH received before the DCI, the feedback information of the second PDSCH being not sent.

For example, the second PDSCH is received before the current DCI. If the transmission resource is allocated for the feedback information of the second PDSCH, and the feedback information of the second PDSCH is not sent for a specific reason, the first information field may trigger the feedback information for the PDSCH.

In NR version 16 (Rel-16), a NR-based Access to Unlicensed Spectrum (NR-U) system may support the introduction of a special value of HARQ feedback timing in the DCI, and the special value indicates that the feedback timing corresponding to the PDSCH scheduled by the DCI and PUCCH resources cannot be determined for the time being. Later, the network device may send trigger signaling, and the terminal device may determine, based on the trigger signaling, to transmit the feedback information corresponding to the previous PDSCH. In this case, separate trigger signaling is required to trigger the feedback information corresponding to the previous PDSCH. Then, when it is necessary to conduct data scheduling on the terminal device and trigger the feedback information corresponding to the previous PDSCH in a time slot, the network device is required to send two pieces of DCI, which will significantly reduce the transmission efficiency of DCI. In the embodiments of the disclosure, the PDSCH needing to send the feedback information may be determined based on whether the first information field of the DCI triggers the feedback information, so as to avoid sending a single piece of DCI to trigger the feedback information of the PDSCH that does not send the feedback information, thus saving signaling overhead.

If the first information field is used for triggering a feedback sequence, the PDSCH corresponding to the feedback sequence may not be explicitly indicated by the first information field, specifically, it may be determined based on a preset rule in the terminal device or based on other configuration signaling of the network device.

In the embodiments of the disclosure, the PDSCH corresponding to the feedback sequence triggered by the first information field may also be explicitly indicated by the first information field.

For example, if the first information field includes multiple bits, each of the multiple bits represents one PDSCH respectively. For example, the first bit represents a PDSCH scheduled by the current DCI; the second bit represents a PDSCH which is one PDSCH before the PDSCH scheduled by the current DCI; the third bit represents a PDSCH which is two PDSCHs before the PDSCH scheduled by the current DCI, and so on. 1 represents that the feedback information of the corresponding PDSCH needs to be sent, and 0 represents that the feedback information of the corresponding PDSCH does not need to be sent. In other words, the sending of the feedback information of the corresponding PDSCH may be triggered via a bit mapping manner. If multiple bits are all 0, it represents that the first information field is not used for triggering the feedback sequence.

For example, if the first information field includes multiple bits, and each bit represents a PDSCH group, when the value of the bit is 1, it indicates that the feedback information of the corresponding PDSCH group needs to be sent; and when the value of the bit is 0, it indicates that feedback information of the corresponding PDSCH group does not need to be sent. That is, the sending of the feedback information of the corresponding PDSCH group may be triggered via a bit mapping manner. If multiple bits are all 0, then the first information field is not used for triggering the feedback sequence.

The feedback sequence in the embodiments of the disclosure may be generated by using a semi-static HARQ codebook. In this case, the number of bits of the feedback information carried in a PUCCH may be determined in a semi-static manner, independent of the actual scheduling situation.

Or, the HARQ feedback sequence in the embodiments of the disclosure may also be generated based on a dynamic HARQ codebook. The terminal device may determine the number of bits of the feedback information based on the scheduling of the network device, which can reduce a feedback overhead. In the method, the terminal device may determine the number of actually scheduled PDSCHs based on a Downlink Assignment Index (DAI) in the DCI. For the DCI in format 1_0, the DAI information field may always exist, that is, when the feedback sequence is generated by using a semi-static HARQ codebook generation manner, and the DAI information field is not needed, the DAI information field still exists in the DCI. For the DCI in format 1_1, the feedback sequence may be generated by using a dynamic HARQ codebook generation manner, in this case, the DAI information field may exist, or else, the DCI may not include the DAI information field.

The above introduces the determination of the PDSCH corresponding to the feedback sequence if the first information field is used for triggering the feedback sequence and if the first information field is not used for triggering the feedback sequence. The following shows how to determine transmission parameter for sending the feedback sequence based on whether the first information field triggers the feedback sequence.

Before how to determine the transmission parameter for sending the feedback sequence is introduced, the transmission parameter is introduced first.

The transmission parameter mentioned in the embodiments of the disclosure may refer to the parameters used by the terminal device to send the feedback sequence on a physical channel and may include at least one of the following: a feedback time unit occupied for sending the feedback sequence, a HARQ feedback timing occupied for sending the feedback sequence, a PUCCH resource occupied for sending the feedback sequence, and a PUCCH transmission power occupied for sending the feedback sequence.

The feedback time unit occupied for sending the feedback sequence may be a time slot, a mini-slot, a symbol, etc.

The HARQ feedback timing may refer to the number of time units between the feedback time units and specific time units. The specific times unit may be one of: the time units occupied by the PDSCH scheduled by the DCI; the time units separated by certain time units from the PDSCH scheduled by the DCI; the time units occupied by the DCI; or the time units separated by certain time units from the time unit occupied by the DCI; the end position of downlink resource after the DCI or the PDSCH scheduled by the DCI, the switching point position from downlink to uplink, or the starting position of the uplink resource (specifically, an end position of the first downlink resource after the DCI or the PDSCH scheduled by the DCI, the first switching point position from downlink to uplink after the DCI or the PDSCH scheduled by the DCI, or the starting position of the first uplink resource after the DCI or the PDSCH scheduled by the DCI).

The PUCCH resource may refer to an occupied physical resource in the feedback time unit, during the transmission of the feedback sequence by using the PUCCH. For example, the PUCCH resource may be a symbol in the feedback time unit (for example, the time slot or the mini time slot). The PUCCH resource in the embodiments of the disclosure may be a resource for at least one of the following dimensions: time domain, frequency domain, or code domain.

The PUCCH transmission power may be the transmitting power adopted by the terminal device when the PUCCH is used for the transmission of feedback sequence.

It is to be understood that the transmission parameter in the embodiments of the disclosure may be transmission parameter except the feedback time unit, the PUCCH resource, the HARQ feedback timing and the PUCCH transmission power, which is not specifically limited by the embodiments of the disclosure.

In the embodiments of the disclosure, if the first information field is used for triggering the feedback sequence and the first information field is not used for triggering the feedback sequence, the transmission parameter of the physical channel may respectively be provided from different transmission parameter sets.

Specifically, for the same type of transmission parameter, a first transmission parameter set and a second transmission parameter set different from the first transmission parameter set may be set respectively on the terminal device. If the first information field is used for triggering the feedback sequence, the used transmission parameter may be provided from the first transmission parameter set. If the first information field is not used for triggering the feedback sequence, the used transmission parameter may be provided from the second transmission parameter set.

In the embodiments of the disclosure, when the PDSCH corresponding to the feedback sequence triggered by the first information field is the PDSCH before the DCI, the time interval between the DCI and the PUCCH for sending the feedback sequence may be very small (for example, which may be that the PDSCH has been demodulated and the feedback information has been prepared), but the feedback sequences may include a large amount of information. If the first information field is not used for triggering the feedback sequence and the triggering of the feedback sequence is realized by the DCI scheduling the PDSCH, the feedback sequence may include the PDSCH scheduled by the DCI. In this case, it is necessary to ensure sufficient decoding-receiving delay, based on which it can be seen that the characteristics corresponding to two feedback modes are different, so the parameters of transmission channels are also different. In the embodiments of the disclosure, the value range of each transmission parameter may be configured based on the requirements of different feedback modes, so as to ensure performance optimization.

Both the first transmission parameter set and the second transmission parameter set may be preset on the terminal device based on a protocol or configured by the network device to the terminal device. Or, one of the transmission parameter sets is preset on the terminal device based on the protocol, and the other of the transmission parameter sets may be configured by the network device to the terminal device.

The first transmission parameter set and the second transmission parameter set may not have the same transmission parameter, or may have at least one same transmission parameter.

For example, the first transmission parameter set is a subset of the second transmission parameter set; or, the second transmission parameter set is a subset of the first transmission parameter set. In the implementation, the network device may be only used to configure a transmission parameter set to the terminal device and to indicate to the terminal device which transmission parameter in the transmission parameter set may be used as another transmission parameter set, thereby saving the overhead of bits.

The following describes an example that the first transmission parameter set is the subset of the second transmission parameter set.

In an implementation, assuming that the transmission parameter in the second transmission parameter set are the transmission parameter with a certain selection order (that is, when the transmission parameter is provided from the second transmission parameter set, the transmission parameter is selected in a certain order until the appropriate transmission parameter is selected), then the transmission parameter in the first transmission parameter set may be the first A transmission parameter in the second transmission parameter set.

In another implementation, the first transmission parameter set may consist of the transmission parameter whose values are in a certain range in the second transmission parameter set. For example, the first transmission parameter set consists of the transmission parameter whose values are not greater than a certain threshold in the second transmission parameter set.

It is to be understood that the scheme shown in FIG. 2 describes an example that the DCI triggers the feedback sequence. In some embodiments, the transmission parameter set may also include an element which may be used for indicating that the feedback information is not required to be sent for the time being. For example, the second transmission parameter set may include an element which indicates that the feedback information is not required to be sent for the time being, and if the terminal device selects this element from the second transmission parameter set, the terminal device may not need to send the feedback information for a while; specifically the terminal device may not need to send the feedback information of the PDSCH scheduled by the DCI, but may send other feedback information, or all the feedback information is not required to be sent.

The transmission parameter set mentioned in the embodiments of the disclosure may be a HARQ feedback timing set, a PUCCH resource set or a PUCCH transmission power set.

The following describes an example that the transmission parameter is respectively the HARQ feedback timing and the PUCCH resource, and the transmission parameter sets are respectively the HARQ feedback timing set and the PUCCH resource set.

In an implementation, each of the first transmission parameter set and the second transmission parameter set is the HARQ feedback timing sets, hereinafter referred to as a first HARQ feedback timing set and a second HARQ feedback timing set respectively.

Herein, a number of time units included in the first HARQ feedback timing set is different from a number of time units included in the second HARQ feedback timing set, and/or a size of time units included in the first HARQ feedback timing set is different from a size of time units included in the second HARQ feedback timing set.

Specifically, a granularity of the time units included in the first HARQ feedback timing set is different from a granularity of the time units included in the second HARQ feedback timing set.

In the embodiments of the disclosure, the granularity of the time units included in the HARQ feedback timing sets may refer to the unit of the time unit. For example, the granularity of the time unit may be the time slot, the mini time slot or the symbol, etc.

Optionally, the granularity of the time unit included in the first HARQ feedback timing set is greater than the granularity of the time unit included in the second HARQ feedback timing set.

Specifically, when the feedback sequence is triggered by the first information field, the triggered feedback sequence is usually the feedback information of the PDSCH before the DCI. In this case, the time interval between the DCI and the PUCCH used for sending the feedback sequence may be very small, and the granularity of the time unit included in the first HARQ feedback timing set may be less than the granularity of the time unit included in the second HARQ feedback timing set.

For example, the granularity of the time unit included in the second transmission parameter set may be the time slot, while the granularity of the time unit included in the first transmission parameter set may be the mini time slot or the symbol.

Or, the granularity of the time unit included in the second transmission parameter set is the time slot, while the granularity of the time unit included in the first transmission parameter set is the time slot and the symbol.

For example, the granularity of the second HARQ feedback timing set may be the time slot, and specifically, the second HARQ feedback timing set is {1, 2, 3, 4, 5, 6, 7, 8}, whose unit is the time slot. The unit of at least one of the elements included in the first HARQ feedback timing set is not the time slot, and specifically, the second HARQ feedback timing set is {1 symbol, 2 symbol, 7 symbol, 1 time slot, 2 time slot, 3 time slot}, or the second HARQ feedback timing set is {1, 2, 3, 4, 5, 6, 7, 8} whose unit is a sub-slot (for example, the length of the sub-slot is 1 symbol, 2 symbol, 7 symbol).

For example, the number of elements in the second HARQ feedback timing set is different from the number of elements in the first HARQ feedback timing set, and/or the value of at least one of elements in the second HARQ feedback timing set is different from the value of at least one of elements in the first HARQ feedback timing set. For example, the second HARQ feedback timing set is {1, 2, 4, 6, 8, 10, 12, 16}, whose unit is the time slot, and the first HARQ feedback timing set is {1 symbol, 2 symbol, 7 symbol, 1 time slot}.

The elements included in the second transmission parameter set and the first transmission parameter set are illustrated in Table 1 below.

TABLE 1

| HARQ feedback timing indication information field | Second HARQ feedback timing set | First HARQ feedback timing set | | | |
|---|---|---|---|---|---|
| | | Implementation 1-a | Implementation 1-b | Implementation 2-a | Implementation 2-b |
| 000 | 1 Time slot | 1 Time slot | 1 Time slot | 1 Symbol | 1 Sub-slot |
| 001 | 2 Time slot | 2 Time slot | 2 Time slot | 2 Symbol | 2 Sub-slot |
| 010 | 4 Time slot | 4 Time slot | 4 Time slot | 4 Symbol | 4 Sub-slot |
| 011 | 6 Time slot | 6 Time slot | 6 Time slot | 7 Symbol | 6 Sub-slot |
| 100 | 8 Time slot | — | 8 Time slot | 1 Time slot | 8 Sub-slot |
| 101 | 12 Time slot | — | 12 Time slot | 2 Time slot | 10 Sub-slot |
| 110 | 16 Time slot | — | 16 Time slot | 3 Time slot | 12 Sub-slot |
| 111 | Temporarily not determined | — | — | 4 Time slot | — |

In another implementation, the first transmission parameter set and the second transmission parameter set may be respectively PUCCH resource sets. Here, it is assumed that the first transmission parameter set is a first PUCCH resource set and the second transmission parameter set is a second PUCCH resource set.

The first PUCCH resource set may be a subset of the second PUCCH resource set.

Specifically, the first B elements in the second PUCCH resource set may constitute as the first PUCCH resource set. Or, the elements with a specific PUCCH format in the second PUCCH resource set may constitute as the first PUCCH resource set.

The second PUCCH resource set in the embodiments of the disclosure may be shown in Table 2 below. The first PUCCH resource set may be part of the elements shown in Table 2 below. A Physical Resource Block (PRB) offset in Table 2 is the PRB offset of the PUCCH resource relative to the edge of a Band Width Part (BWP).

TABLE 2

| Index | PUCCH format | First symbol | Number of symbols | PRB offset | Set of initial Cyclic Shift (CS) index |
|---|---|---|---|---|---|
| 0 | 0 | 12 | 2 | 0 | {0, 3} |
| 1 | 0 | 12 | 2 | 0 | {0, 4, 8} |
| 2 | 0 | 12 | 2 | 3 | {0, 4, 8} |
| 3 | 1 | 10 | 4 | 0 | {0, 6} |
| 4 | 1 | 10 | 4 | 0 | {0, 3, 6, 9} |
| 5 | 1 | 10 | 4 | 2 | {0, 3, 6, 9} |
| 6 | 1 | 10 | 4 | 4 | {0, 3, 6, 9} |
| 7 | 1 | 4 | 10 | 0 | {0, 6} |
| 8 | 1 | 4 | 10 | 0 | {0, 3, 6, 9} |
| 9 | 1 | 4 | 10 | 2 | {0, 3, 6, 9} |
| 10 | 1 | 4 | 10 | 4 | {0, 3, 6, 9} |
| 11 | 1 | 0 | 14 | 0 | {0, 6} |
| 12 | 1 | 0 | 14 | 0 | {0, 3, 6, 9} |
| 13 | 1 | 0 | 14 | 2 | {0, 3, 6, 9} |
| 14 | 1 | 0 | 14 | 4 | {0, 3, 6, 9} |
| 15 | 1 | 0 | 14 | $[N_{BWP}^{size}/4]$ | {0, 3, 6, 9} |

In the embodiments of the disclosure, the terminal device may select the transmission parameter from the first transmission parameter set or the second transmission parameter set based on the second information field included in the DCI.

Taking that the transmission parameter is the PUCCH resource as an example, if the first information field is used for triggering the feedback sequence, the HARQ feedback timing may be selected from the first HARQ feedback timing set based on a HARQ feedback indicator represented by the bit(s) in the second information field. When the second information field is not used for triggering the feedback sequence, the HARQ feedback timing may be selected from the second HARQ feedback timing set based on the HARQ feedback indicator represented by the bit(s) in the second information field.

Specifically, the PUCCH resources used by the terminal device to send the feedback sequence may be indicated by a PUCCH resource indication information field in the DCI. The terminal device may predetermine a PUCCH resource set (for example, the first PUCCH resource set or the second PUCCH resource set), which may include 16 PUCCH resources or fewer. The terminal device may determine a PUCCH resource from the PUCCH resource set as the currently used PUCCH resource according the PUCCH resource indication information field (the second information field).

Taking that the transmission parameter is the HARQ feedback timing as example, the terminal device may determine a HARQ feedback timing set (for example, the first HARQ feedback timing set or the second HARQ feedback timing set), and the network device may indicate, through the DCI, a value in the HARQ feedback timing set as k. If the PDSCH scheduled by the DCI is transmitted in the time slot n, the feedback information of the PDSCH may be transmitted in the time slot n+k. The first HARQ feedback timing set or the second HARQ feedback timing set mentioned above may include up to 8 feedback timing values. For the DCI in format 1_0, the set is preset on the terminal device based on a protocol. For the DCI in format 1_1, the feedback timing set may be configured by the network device.

For example, as shown in Table 1, assuming that an implementation of the first HARQ feedback timing set is 2-a, if the first information field is used for triggering the feedback sequence and the bit value of the second information field is 111, the feedback timing is 4 time slot.

In the embodiments of the disclosure, because the number of transmission parameter included in the first transmission parameter set and the number of transmission parameter included in the second transmission parameter set may be different, the number of bits in the second information field may be different.

For example, when the first transmission parameter set includes 8 transmission parameter, the bit length occupied by the second information field may be 3, and when the first transmission parameter set includes 10 transmission parameter, the bit length occupied by the second information field may be 4.

Because if the first information field is used for triggering the feedback sequence and if the first information field is not used for triggering the feedback sequence, the transmission parameter sets for selecting the transmission parameter are different, the bit length of the second information field may be determined based on whether the first information field triggers the feedback sequence.

For example, as shown in Table 1, if the first information field is used for triggering the feedback sequence, and an implementation of the first HARQ feedback timing set is 1-a, the bit length of the second information field is 2 bits.

As described above, the transmission parameter may be provided from the first transmission parameter set or the second transmission parameter set, to send the feedback sequence, but in the embodiments of the disclosure, the manner for determining the transmission parameter based on whether the first information field is used for triggering the feedback sequence is not limited to this, and the embodiments of the disclosure may also have other implementations.

In an implementation, the terminal device may determine the transmission parameter based on a third information field. When the transmission parameter is determine, it may be determined, based on whether the first information field triggers the feedback sequence, whether the transmission parameter determined based on the third information field is the transmission parameter expected by the terminal device. If it is the transmission parameter expected by the terminal device, the terminal device may send the feedback sequence by using the transmission parameter; or else, the terminal device may not send the feedback sequence by using the transmission parameter, for example, it may discard the feedback sequence or wait for an indication from the subsequent DCI to send the feedback information in the feedback sequence.

For example, for the HARQ feedback timing, the feedback timing available to the terminal device is 8 feedback timings in the set {1, 2, 3, 4, 5, 6, 7, 8}. {1, 2, 3, 4, 5, 6} in the 8 feedback timings are used for sending the feedback sequence triggered by the first information field, and {1, 2, 3, 4, 5, 6, 7, 8} may all be used for sending the feedback sequence that is not triggered by the first information field. The third information field is taken as the HARQ feedback timing information field, and the value of the information field is 111, so the terminal device may select the 8th feedback timing from the feedback timing set, that is, 8. In this case, the terminal device may verify, based on whether the first information field triggers the feedback sequence, whether the selected feedback timing is the expected feedback timing. For example, if the first information field is used for triggering the feedback sequence, it is considered that the selected feedback timing is not the expected feedback timing, and the terminal device may have no need to send the feedback sequence. If the first information field is not used for triggering the feedback sequence, it is considered that the selected feedback timing is the expected feedback timing, and the terminal device may send the feedback sequence based on the selected feedback timing.

In another implementation, the terminal device may determine, based on whether the first information field is used for triggering the feedback sequence, a starting time domain position used for determining, based on the feedback timing, the feedback time unit. The feedback time unit is determined based on the starting time domain position. Specifically, the terminal device may add the feedback timing to the starting time domain position to obtain the time unit as the feedback time unit.

In the implementation, if the first information field is used for triggering the feedback sequence, the starting time domain position is the end position of the downlink resource after the DCI, the switching point position from downlink to uplink, or the starting position of the uplink resource. For example, the end position of the downlink resource, the switching point position from downlink to uplink, or the starting position of the uplink resource may be the end position of the downlink resource in the COT where the terminal device is, the switching point position from downlink to uplink in the COT where the terminal device is, or the starting position of the uplink resource in the COT where the terminal device is.

The starting time domain position is: the end position of the first downlink resource, the first switching point position from downlink to uplink or the starting position of the first uplink resource, which is after the DCI or the PDSCH scheduled by the DCI within the COT where the DCI is.

Specifically, if the end position of the first downlink resource after the DCI or the PDSCH scheduled by the DCI, the first switching point position from downlink to uplink after the DCI or the PDSCH scheduled by the DCI, or the first starting position of the uplink resource after the DCI or the PDSCH scheduled by the DCI is taken as the starting time domain position, the time domain length between the starting time domain position and the farthest time unit occupied by sending the feedback sequence required to be sent can be shortened. In this case, the time domain difference between the elements with similar size in the HARQ feedback timing set may be small, so as to indicate the HARQ feedback timing more precisely. If the first information field is used to trigger the feedback sequence, the more precise indication may make the selection of feedback resources more flexible, and there is a greater chance to select the resource close to the DCI for the transmission of the feedback sequence.

Figure 3:
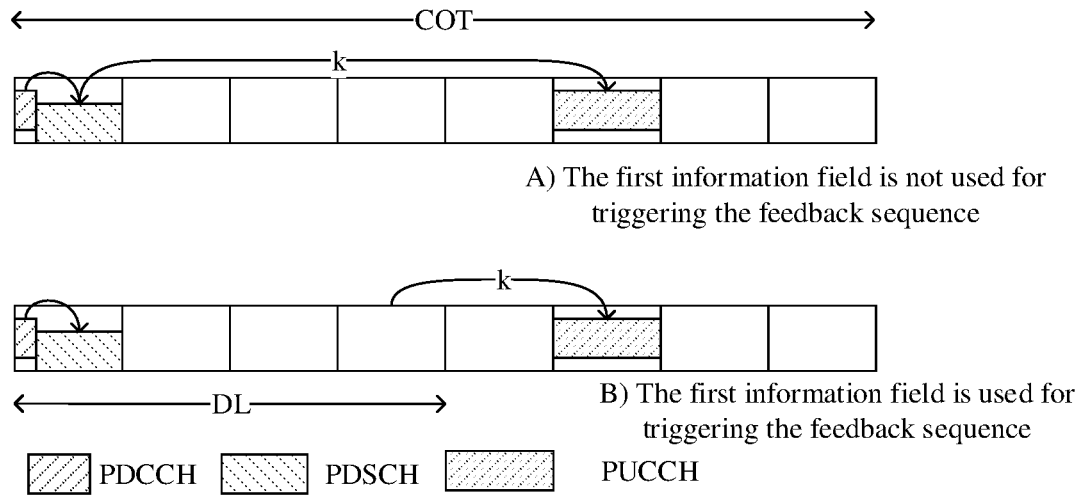
FIG. 3 is a schematic diagram of a starting time domain position of a HARQ feedback timing according to an embodiment of the disclosure.

For example, as shown in FIG. 3, the terminal device receives the DCI in the time slot m. The DCI is used for scheduling the PDSCH to be transmitted in the time slot n. The time slot m is before the time slot n or the time slot m is the time slot n, and the value indicated by the HARQ feedback timing is k. When the first information field indicates that it is not used for triggering the terminal device to send the feedback sequence (i.e., case A in the figure), the terminal device determines that the feedback information corresponding to the PDSCH scheduled by the DCI is transmitted in the time slot n+k. When the first information field indicates that it is used for triggering the terminal device to send the feedback sequence (i.e., case B in the figure), the terminal device determines that the feedback sequence is transmitted in the time slot q+k, where q is the end position of the first downlink resource after the time slot m, or the first switching point position from downlink to uplink after the time slot m, or the starting position of the first uplink resource after the time slot m.

Optionally, the first information field in the embodiments of the disclosure may be the DAI information field.

Specifically, the DAI information field is used for counting the PDSCH, which is used for generating the feedback sequence based on the dynamic HARQ codebook. When the format of the DCI is 1_0 and the feedback sequence is generated based on the semi-static HARQ codebook, the DAI information field will be taken as a useless information field, and then the DAI information field may be taken as the first information field in the embodiments of the disclosure.

For example, when the value of the DAI is 11, it indicates that the terminal device is triggered to send the feedback sequence, while other values of the DAI indicate that the DAI is not used for triggering the terminal device to send the feedback sequence.

Optionally, in the embodiments of the disclosure, the first information field is the PUCCH resource indication information field.

When the first information field is a PUCCH resource indication information field, the first information field, when indicating the feedback of the feedback sequence, indicates a PUCCH resource for sending the feedback sequence.

Assuming that indication range of the PUCCH resource indication information field is N available resources, when the PUCCH resource indication information field indicates a specific resource of the N resources, the PUCCH resource indication information field is used for triggering the feedback sequence. In this case, the terminal device may transmit the feedback sequence through the specific resource.

For example, as shown in Table 3 below, the PUCCH resource indication information field may indicate 8 PUCCH resources. When the value of the PUCCH resource indication information field is 111, it represents that the PUCCH resource is used for triggering the feedback sequence and may be used to send the feedback sequence. In this case, the HARQ feedback timing and/or the PUCCH transmission power may be selected from the corresponding transmission parameter set.

TABLE 3

| PUCCH resource indication information field | PUCCH resource |
| --- | --- |
| 000 | PUCCH resource 1 (time domain, frequency domain, code domain) |
| 001 | PUCCH resource 2 (time domain, frequency domain, code domain) |
| 010 | PUCCH resource3 (time domain, frequency domain, code domain) |
| ... | ... |
| 111 | PUCCH resource 8 (time domain, frequency domain, code domain), send the first feedback information |

Therefore, in the embodiments of the disclosure, the existing information field may be reused by taking the DAI information field and the PUCCH resource information field as the first information field, thus avoiding a large bit overhead.

In the embodiments of the disclosure, the HARQ feedback timing information field or the PUCCH transmission power information field may also be reused as the first information field, which is not limited in the embodiments of the disclosure.

In S240, the terminal device sends the feedback sequence on the physical channel by using the transmission parameter.

In S250, based on whether the first information field included in the DCI is used for triggering the feedback sequence, the network device determines the transmission parameter for receiving the feedback sequence on the physical channel.

For the manner that the network device determines the transmission parameter based on whether the first information field included in the DCI is used for triggering the feedback sequence may refer to the above description about the terminal device determines the transmission parameter based on whether the first information field triggers the feedback sequence, which will not be repeated here for brevity.

It is to be understood that the method shown in FIG. 2 is only a specific implementation in the embodiments of the disclosure and shall not cause any special limitation to the embodiments of the disclosure.

For example, in the method shown in FIG. 2, the network device determines the transmission parameter for receiving the feedback sequence based on whether the first information field is used for triggering the feedback sequence, but the embodiments of the disclosure are not limited to that. Specifically, in the embodiments of the disclosure, the network device may first determine the transmission parameter of the physical channel used for sending the feedback sequence, and determine, based on the transmission parameter, whether the feedback sequence is triggered by the first information field.

In S260, the network device receives the feedback sequence on the physical channel by using the transmission parameter.

After receiving the feedback sequence, the network device may schedule the subsequent data based on the feedback sequence. For example, if the feedback information of at least one PDSCH in the feedback sequence is NACK, the network device may schedule the at least one PDSCH again.

In the embodiments of the disclosure, the DCI may include the first information field which may or may not be used for triggering the feedback sequence, and the terminal device may send the feedback sequence based on whether the first information field is used for triggering the feedback sequence, so that it may flexibly select the appropriate transmission parameter based on whether the feedback sequence is triggered by the first information field, and then the communication performance is improved.

It is to be understood that the numbers of the steps described in the method shown in FIG. 2 does not represent the sequence in which the steps are executed. For example, S250 may be executed before S220, S230, or S240.

In the embodiments of the disclosure, the transmission parameter of the physical channel may be determined based on a triggering mode of the feedback sequence. The above mainly introduces that the transmission parameter of the physical channel may be determined based on whether the first information field of the DCI is used for triggering the feedback sequence, that is, it is possible to distinguish the triggering mode as the triggering by the first information field or not by the first information field, but the embodiments of the disclosure is not limited to that. In the embodiments of the disclosure, there may also be other triggering modes. All the technical solutions for determining the transmission parameter of the physical channel based on the triggering mode of the feedback sequence shall fall within the protection scope of the embodiments of the disclosure.

Or, in the embodiments of the disclosure, the first information field may trigger the feedback sequence inevitably, but the PDSCHs corresponding to the feedback sequences triggered by the first information field in the case of different values are different. In this case, the transmission parameter of the physical channel may be determined based on the value of the first information field. The specific determination mode can refer to the description above. For example, when the PDSCH corresponding to the triggered feedback sequence is PDSCH A, a selection mode of the transmission parameter can refer to the selection mode of the transmission parameter if the first information field is used for triggering the feedback sequence. When the PDSCH corresponding to the triggered feedback sequence is PDSCH B, the selection mode of the transmission parameter can refer to the selection mode of the transmission parameter if the first information field is not used for triggering the feedback sequence.

Or, in the embodiments of the disclosure, the PDSCH corresponding to the feedback sequence triggered by the DCI may be determined by other modes rather than the first information field. In this case, the transmission parameter of the physical channel may be determined based on the PDSCH corresponding to the feedback sequence, and the specific determination mode may refer to the description above. For example, when the PDSCH corresponding to the triggered feedback sequence is PDSCH A, a selection mode of the transmission parameter can refer to the selection mode of the transmission parameter if the first information field is used for triggering the feedback sequence. When the PDSCH corresponding to the triggered feedback sequence is PDSCH B, the selection mode of the transmission parameter can refer to the selection mode of the transmission parameter if the first information field is not used for triggering the feedback sequence.

Figure 4:
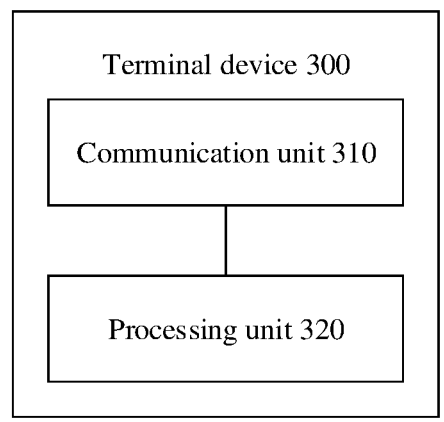
FIG. 4 is a schematic block diagram of a terminal device according to an embodiment of the disclosure.

FIG. 4 is a schematic block diagram of a terminal device 300 according to an embodiment of the disclosure. The terminal device 300 includes a communication unit 310 and a processing unit 320.

The communication unit 310 is configured to receive the DCI, the DCI including the first information field and being used for scheduling at least one PDSCH.

The processing unit 320 is configured to, based on whether the first information field is used for triggering the feedback sequence, determine the transmission parameter for sending the feedback sequence on the physical channel.

The communication unit 310 is further configured to send the feedback sequence on the physical channel by using the transmission parameter.

Optionally, in the embodiments of the disclosure, if the first information field is used for triggering the feedback sequence, the transmission parameter is provided from the first transmission parameter set; if the first information field is not used for triggering the feedback sequence, the transmission parameter is provided from the second transmission parameter set. The first transmission parameter set is different from the second transmission parameter set.

Optionally, in the embodiments of the disclosure, the first transmission parameter set is a subset of the second transmission parameter set; or, the second transmission parameter set is a subset of the first transmission parameter set.

Optionally, in the embodiments of the disclosure, the transmission parameter is provided from the first transmission parameter set or the second transmission parameter set based on the second information field included in the DCI.

Optionally, in the embodiments of the disclosure, the bit length of the second information field is determined based on the value of the first information field.

Optionally, in the embodiments of the disclosure, each of the first transmission parameter set and the second transmission parameter set is the HARQ feedback timing set.

A number of time units included in the first transmission parameter set is different from a number of time units included in the second transmission parameter set, and/or a size of time units included in the first transmission parameter set is different from a size of time units included in the second transmission parameter set.

Optionally, in the embodiments of the disclosure, the granularity of the time units included in the first transmission parameter set is different from the granularity of the time units included the second transmission parameter set.

Optionally, in the embodiments of the disclosure, the processing unit 320 is further configured to:
determine the transmission parameter based on the value of the third information field included in the DCI; and
based on whether the first information field is used for triggering the feedback sequence, verify whether the transmission parameter is the transmission parameter used for sending the feedback sequence.

Optionally, in the embodiments of the disclosure, the processing unit 320 is further configured to:
based on whether the first information field is used for triggering the feedback sequence, determine the starting time domain position used for determining, based on the feedback timing, the feedback time unit; and
determine the feedback time unit based on the starting time domain position.

Optionally, in the embodiments of the disclosure, if the first information field is used for triggering the feedback sequence, the starting time domain position is one of: an end position of a first downlink resource after the DCI, a first switching point position from downlink to uplink after the DCI, or a starting position of a first uplink resource after the DCI.

Optionally, in the embodiments of the disclosure, the first information field is the DAI information field; or,
the first information field is the PUCCH resource indication information field.

Optionally, in the embodiments of the disclosure, when the first information field is the DAI information field, the feedback sequence is generated based on the semi-static HARQ codebook generation manner, and the format of the DCI is format 1_0.

Optionally, in the embodiments of the disclosure, when the first information field is the PUCCH resource indication information field, the first information field, when indicating the feedback of the feedback sequence, indicates the PUCCH resource used for sending the feedback sequence.

Optionally, in the embodiments of the disclosure, the transmission parameter includes at least one of the following:
the feedback time unit used for sending the feedback sequence, the PUCCH resource used for sending the feedback sequence, a PUCCH transmission power used for sending the feedback sequence, or the feedback timing used for sending the feedback sequence.

Optionally, in the embodiments of the disclosure, the PDSCH corresponding to the feedback sequence triggered by the first information field is at least one of the following:
the PDSCH corresponding to at least one HARQ process index supported by the terminal device;
the PDSCH received in the PDSCHs corresponding to at least one HARQ process index supported by the terminal device;
the PDSCH corresponding to at least one HARQ process index group supported by the terminal device;
the PDSCH received in the PDSCHs corresponding to at least one HARQ process index group supported by the terminal device;
the PDSCH included in at least one PDSCH group;
the PDSCH received in the PDSCHs included in at least one PDSCH group;
the PDSCH received in a specific time period before the DCI;
the PDSCH received in a specific time period before the PDSCH scheduled by the DCI;
the first PDSCH received before the DCI, the feedback information of the first PDSCH being not allocated with transmission resources; and
the second PDSCH received before the DCI, the feedback information of the second PDSCH being not sent.

It is to be understood that the terminal device 300 may be used to implement the corresponding operations implemented by the terminal device in the method 200, and for simplicity, will not be elaborated herein.

Figure 5:
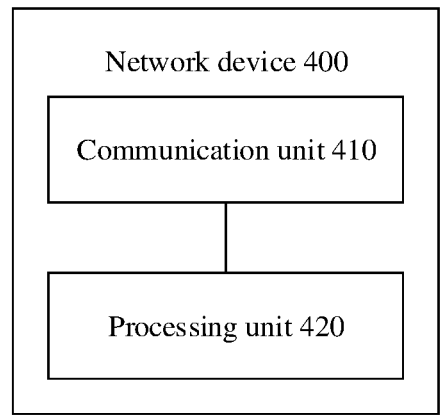
FIG. 5 is a schematic block diagram of a network device according to an embodiment of the disclosure.

FIG. 5 is a schematic block diagram of a network device 400 according to an embodiment of the disclosure. The network device 400 includes a communication unit 410 and a processing unit 420.

The communication unit 410 is configured to send the DCI, the DCI including the first information field, and being used for scheduling at least one PDSCH. The processing unit 420 is configured to, based on whether the first information field is used for triggering the feedback sequence, determine the transmission parameter for receiving the feedback sequence on the physical channel. The communication unit 410 is further configured to receive the feedback sequence on the physical channel by using the transmission parameter.

Optionally, in the embodiments of the disclosure, if the first information field is used for triggering the feedback sequence, the transmission parameter is provided from the first transmission parameter set; if the first information field is not used for triggering the feedback sequence, the transmission parameter is provided from the second transmission parameter set. The first transmission parameter set is different from the second transmission parameter set.

Optionally, in the embodiments of the disclosure, the first transmission parameter set is a subset of the second transmission parameter set; or, the second transmission parameter set is a subset of the first transmission parameter set.

Optionally, in the embodiments of the disclosure, the transmission parameter is transmission parameter, corresponding to the second information field included in the DCI, in the first transmission parameter set or the second transmission parameter set.

Optionally, in the embodiments of the disclosure, the bit length of the second information field is determined based on the value of the first information field.

Optionally, in the embodiments of the disclosure, each of the first transmission parameter set and the second transmission parameter set is the HARQ feedback timing set.

A number of time units included in the first transmission parameter set is different from a number of time units included in the second transmission parameter set, and/or a size of time units included in the first transmission parameter set is different from a size of time units included in the second transmission parameter set.

Optionally, in the embodiments of the disclosure, the granularity of the time units included in the first transmission parameter set is different from the granularity of the time units included in the second transmission parameter set.

Optionally, in the embodiments of the disclosure, the processing unit 420 is further configured to:

based on whether the first information field is used for triggering the feedback sequence, determine the starting time domain position used for determining, based on a feedback timing, a feedback time unit; and determine the feedback time unit based on the starting time domain position.

Optionally, in the embodiments of the disclosure, if the first information field is used for triggering the feedback sequence, the starting time domain position is one of: an end position of a first downlink resource after the DCI, a first switching point position from downlink to uplink after the DCI, or a starting position of a first uplink resource after the DCI.

Optionally, in the embodiments of the disclosure, the first information field is the DAI information field; or, the first information field is the PUCCH resource indication information field.

Optionally, in the embodiments of the disclosure, when the first information field is the DAI information field, the feedback sequence is generated based on the semi-static HARQ codebook generation manner, and the format of the DCI is format 1_0.

Optionally, in the embodiments of the disclosure, when the first information field is the PUCCH resource indication information field, the first information field, when indicating the feedback of the feedback sequence, indicates the PUCCH resource used for sending the feedback sequence.

Optionally, in the embodiments of the disclosure, the transmission parameter includes at least one of the following:

the feedback time unit used for sending the feedback sequence, the PUCCH resource used for sending the feedback sequence, a PUCCH transmission power used for sending the feedback sequence, or the feedback timing used for sending the feedback sequence.

Optionally, in the embodiments of the disclosure, the PDSCH corresponding to the feedback sequence triggered by the first information field may be at least one of the following:

the PDSCH corresponding to at least one HARQ process index supported by the terminal device;

the PDSCH received in the PDSCHs corresponding to at least one HARQ process index supported by the terminal device;

the PDSCH corresponding to at least one HARQ process index group supported by the terminal device;

the PDSCH received in the PDSCHs corresponding to at least one HARQ process index group supported by the terminal device;

the PDSCH included in at least one PDSCH group;

the PDSCH received in the PDSCHs included in at least one PDSCH group;

the PDSCH received in a specific time period before the DCI;

the PDSCH scheduled in a specific time period before the PDSCH scheduled by the DCI;

the first PDSCH scheduled before the DCI, the feedback information of the first PDSCH being not allocated with transmission resources; and the second PDSCH scheduled before the DCI, the feedback information of the second PDSCH being not sent.

It is to be understood that the network device 400 may be used to implement the corresponding operations implemented by the network device in the method 200, and for simplicity, will not be elaborated herein.

Figure 6:
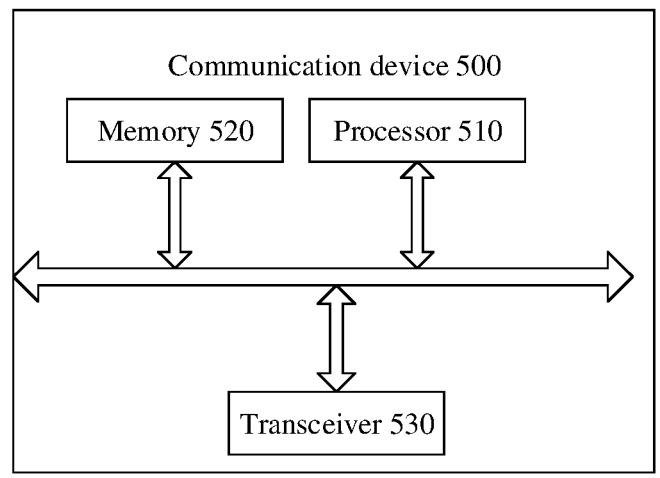
FIG. 6 is a schematic block diagram of a communication device according to an embodiment of the disclosure.

FIG. 6 is a schematic structure diagram of a communication device 500 according to an embodiment of the disclosure. The communication device 500 shown in FIG. 6 includes a processor 510. The processor 510 may call a computer program from a memory and run the program, to implement the method in the embodiments of the disclosure.

Optionally, as shown in FIG. 6, the communication device 500 may further include the memory 520. The processor 510 may call and run the computer program from the memory 520 to implement the method in the embodiments of the disclosure.

The memory 520 may be a separate device independent of the processor 510, and may also be integrated in the processor 510.

Optionally, as shown in FIG. 6, the communication device 500 may further include a transceiver 530, and the processor 510 may control the transceiver 530 to communicate with another device, specifically sending information or data to the other device or receiving information or data from the other device.

The transceiver 530 may include a transmitter and a receiver. The transceiver 530 may further include an antenna. The number of the antenna may be one or more.

Optionally, the communication device 500 may specifically be the network device of the embodiments of the disclosure, and the communication device 500 may implement corresponding flows implemented by the network device in each method of the embodiments of the disclosure. For simplicity, elaborations are omitted herein.

Optionally, the communication device 500 may specifically be the mobile terminal/terminal device of the embodiments of the disclosure, and the communication device 500 may implement corresponding flows implemented by the mobile terminal/terminal device in each method of the embodiments of the disclosure. For simplicity, elaborations are omitted herein.

Figure 7:
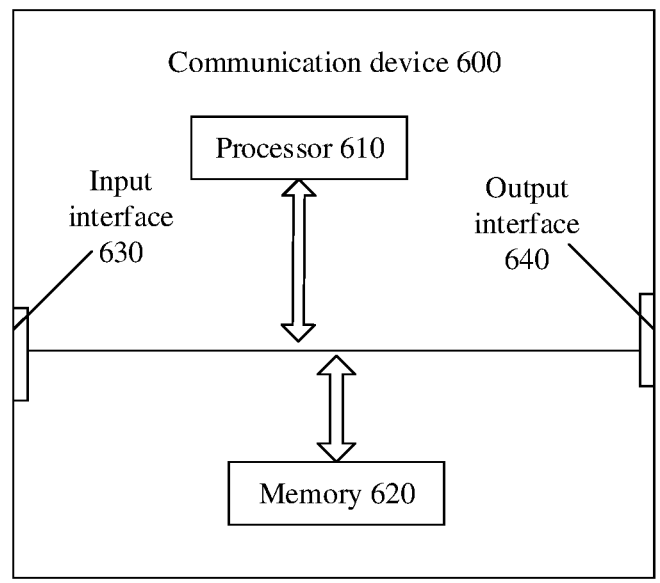
FIG. 7 is a schematic block diagram of a communication apparatus according to an embodiment of the disclosure.

FIG. 7 is a schematic structure diagram of a communication device 600 according to an embodiment of the disclosure. The communication device 600 shown in FIG. 7 includes a processor 610. The processor 610 may call a computer program from a memory and run the program, to implement the method in the embodiments of the disclosure.

Optionally, as shown in FIG. 7, the communication device 600 may further include the memory 620. The processor 610 may call and run the computer program from the memory 620 to implement the method in the embodiments of the disclosure.

The memory 620 may be a separate device independent of the processor 610, and may also be integrated in the processor 610.

Optionally, the communication device 600 may further include an input interface 630. The processor 610 may control the input interface 630 to communicate with other devices or chips; specifically, the input interface may acquire information or data sent by other devices or chips.

Optionally, the communication device 600 may further include an output interface 640. The processor 610 may control the output interface 640 to communicate with other devices or chips; specifically, the output interface may output information or data to other devices or chips.

Optionally, the communication device may be applied to the network device of the embodiments of the disclosure, and the communication device may implement corresponding flows implemented by the network device in each method of the embodiments of the disclosure. For simplicity, elaborations are omitted herein.

Optionally, the communication device 600 may be applied to the mobile terminal/terminal device in the embodiments of the disclosure, and the communication device 600 may implement corresponding flows implemented by the mobile terminal/terminal device in each method of the embodiments of the disclosure. For simplicity, elaborations are omitted herein.

It is to be understood that the communication device 600 mentioned in the embodiments of the disclosure may be a chip, which may also be called a system-level chip, a system chip, a chip system or a system-on-chip, etc.

It is to be understood that the processor in the embodiment of the disclosure may be an integrated circuit chip and has a signal processing capability. In an implementation process, each step of the method embodiment may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, step and logical block diagram disclosed in the embodiments of the disclosure may be implemented or executed. The universal processor may be a microprocessor, or the processor may also be any conventional processor and the like. The steps of the method disclosed in combination with the embodiments of the disclosure may be directly embodied to be executed and completed by a hardware decoding processor or executed and completed by a combination of hardware and software modules in the decoding processor. The software module may be located in a mature storage medium in this field such as an RAM, a flash memory, an ROM, a PROM or EEPROM and a register. The storage medium is located in a memory, and the processor reads information in the memory, and completes the steps of the methods in combination with hardware.

It can be understood that the memory in the embodiment of the disclosure may be a volatile memory or a nonvolatile memory, or may include both the volatile and nonvolatile memories. The nonvolatile memory may be a ROM, a PROM, an Erasable PROM (EPROM), an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch link DRAM (SLDRAM) and a Direct Rambus RAM (DR RAM). It is to be noted that the memory of a system and method described in the disclosure is intended to include, but not limited to, memories of these and any other proper types.

It is to be understood that the memories above mentioned are exemplarily but unlimitedly described; for example, the memories in the embodiments of the disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch link DRAM (SLDRAM) and a Direct Rambus RAM (DR RAM). That is, the memories in the embodiments of the disclosure are intended to include, but not limited to, memories of these and any other proper types.

The embodiments of the disclosure also provide a computer-readable storage medium, which is configured to store a computer program.

Optionally, the computer-readable storage medium may be applied to a network device in the embodiments of the disclosure, and the computer program enables a computer to execute corresponding flows implemented by the network device in each method of the embodiments of the disclosure. For simplicity, elaborations are omitted herein.

Optionally, the computer-readable storage medium may be applied to a mobile terminal/terminal device in the embodiments of the disclosure, and the computer program enables a computer to execute corresponding flows implemented by the mobile terminal/terminal device in each method of the embodiments of the disclosure. For simplicity, elaborations are omitted herein.

The embodiments of the disclosure also provide a computer program product, which includes a computer program instruction.

Optionally, the computer program product may be applied to a network device in the embodiments of the disclosure, and the computer program instruction enables a computer to execute corresponding flows implemented by the network device in each method of the embodiments of the disclosure. For simplicity, elaborations are omitted herein.

Optionally, the computer program product may be applied to a mobile terminal/terminal device in the embodiments of the disclosure, and the computer program instruction enables the computer to execute corresponding flows implemented by the mobile terminal/terminal device in each method of the embodiments of the disclosure. For simplicity, elaborations are omitted herein.

The embodiments of the disclosure also provide a computer program.

Optionally, the computer program may be applied to a network device in the embodiments of the disclosure, and the computer program runs in a computer to enable the computer to execute corresponding flows implemented by the network device in each method of the embodiments of the disclosure. For simplicity, elaborations are omitted herein.

Optionally, the computer program may be applied to a mobile terminal/terminal device in the embodiments of the disclosure, and the computer program runs in the computer to enable the computer to execute corresponding flows implemented by the mobile terminal/terminal device in each method of the embodiments of the disclosure. For simplicity, elaborations are omitted herein.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including multiple instructions configured to enable a computer device (which may be a personal computer, a server, a network device or the like) to execute all or part of the steps of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation manner of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A communication method, comprising:
receiving, by a terminal device, Downlink Control Information (DCI), the DCI comprising a first information field and being used for scheduling at least one Physical Downlink Shared Channel (PDSCH);
determining, by the terminal device, a transmission parameter for sending a feedback codebook on a physical channel, based on whether the first information field is used for triggering the feedback codebook; and
sending, by the terminal device, the feedback codebook on the physical channel by using the transmission parameter, wherein
in an event that the first information field is used for triggering the feedback codebook, the transmission parameter is provided from a first transmission parameter set; and
in an event that the first information field is not used for triggering the feedback codebook, the transmission parameter is provided from a second transmission parameter set; and the first transmission parameter set is different from the second transmission parameter set.

2. The method of claim 1, wherein the first transmission parameter set is a subset of the second transmission parameter set.

3. The method of claim 1, wherein the transmission parameter is provided from the first transmission parameter set or the second transmission parameter set based on a second information field comprised in the DCI.

4. The method of claim 1, wherein each of the first transmission parameter set and the second transmission parameter set is a Hybrid Automatic Repeat Request (HARQ) feedback timing set.

5. The method of claim 1, wherein the transmission parameter comprises:
a feedback timing used for sending the feedback codebook.

6. The method of claim 1, wherein the at least one PDSCH corresponding to the feedback codebook triggered by the first information field is:
at least one PDSCH corresponding to at least one HARQ process index supported by the terminal device.

7. The method of claim 1, wherein
the second transmission parameter set comprises a first element representing a feedback timing which is not determined temporarily; and
the first transmission parameter set comprises other elements, except the first element, comprised in the second transmission parameter set.

8. A communication method, comprising:
sending, by a network device, Downlink Control Information (DCI), the DCI comprising a first information field and being used for scheduling at least one Physical Downlink Shared Channel (PDSCH);
determining, by the network device, a transmission parameter for receiving a feedback codebook on a physical channel based on whether the first information field is used for triggering the feedback codebook; and
receiving, by the network device by using the transmission parameter, the feedback codebook on the physical channel, wherein,
in an event that the first information field is used for triggering the feedback codebook, the transmission parameter is provided from a first transmission parameter set; and
in an event that the first information field is not used for triggering the feedback codebook, the transmission parameter is provided from a second transmission parameter set; and the first transmission parameter set is different from the second transmission parameter set.

9. The method of claim 8, wherein the first transmission parameter set is a subset of the second transmission parameter set.

10. The method of claim 8, wherein the transmission parameter is transmission parameter, corresponding to a second information field comprised in the DCI, in the first transmission parameter set or the second transmission parameter set.

11. The method of claim 8, wherein each of the first transmission parameter set and the second transmission parameter set is a Hybrid Automatic Repeat Request (HARQ) feedback timing set.

12. The method of claim 8, wherein
the transmission parameter comprises: a feedback timing used for sending the feedback codebook; and
the at least one PDSCH corresponding to the feedback codebook triggered by the first information field is at least one PDSCH corresponding to at least one HARQ process index supported by the terminal device.

13. A terminal device, comprising: a transceiver and a processor; wherein
the transceiver is configured to receive Downlink Control Information (DCI), the DCI comprising a first information field and being used for scheduling at least one Physical Downlink Shared Channel (PDSCH);
the processor is configured to, based on whether the first information field is used for triggering a feedback codebook, determine transmission parameter for sending the feedback codebook on a physical channel; and
the transceiver is further configured to send the feedback codebook on the physical channel by using the transmission parameter, wherein
in an event that the first information field is used for triggering the feedback codebook, the transmission parameter is provided from a first transmission parameter set; and
in an event that the first information field is not used for triggering the feedback codebook, the transmission parameter is provided from a second transmission parameter set; and the first transmission parameter set is different from the second transmission parameter set.

14. The terminal device of claim 13, wherein the first transmission parameter set is a subset of the second transmission parameter set.

15. The terminal device of claim 13, wherein the transmission parameter is provided from the first transmission parameter set or the second transmission parameter set based on a second information field comprised in the DCI.

16. The terminal device of claim 13, wherein each of the first transmission parameter set and the second transmission parameter set is a Hybrid Automatic Repeat Request (HARQ) feedback timing set.

17. The terminal device of claim 13, wherein
the transmission parameter comprises a feedback timing used for sending the feedback codebook;
the at least one PDSCH corresponding to the feedback codebook triggered by the first information field is at least one PDSCH corresponding to at least one HARQ process index supported by the terminal device.

* * * * *